US012775021B2

(12) United States Patent
Garcia

(10) Patent No.: US 12,775,021 B2
(45) Date of Patent: Oct. 27, 2026

(54) PLUG AND PLAY WHEEL SPEED SENSOR

(71) Applicant: Robert Bosch GmbH, Stuttgart (DE)

(72) Inventor: Jesus Romero Garcia, San Luis (MX)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 18/819,884

(22) Filed: Aug. 29, 2024

(65) Prior Publication Data

US 2026/0063657 A1 Mar. 5, 2026

(51) Int. Cl.
*G01P 1/02* (2006.01)

(52) U.S. Cl.
CPC .................................... *G01P 1/026* (2013.01)

(58) Field of Classification Search
CPC ........................................................ G01P 1/026
USPC ........................................................... 324/160
See application file for complete search history.

(56) References Cited

U.S. PATENT DOCUMENTS

| | | | | |
|---|---|---|---|---|
| 3,916,234 A * | 10/1975 | Stigall | F16C 41/007 310/155 |
| 4,002,937 A * | 1/1977 | Anson | H02K 1/272 310/156.31 |
| 4,171,495 A * | 10/1979 | McNinch, Jr. | G01P 3/443 310/155 |
| 4,940,936 A * | 7/1990 | Grillo | G01P 3/443 310/156.13 |
| 5,011,302 A * | 4/1991 | Mott | G01P 3/443 310/168 |
| 5,122,740 A * | 6/1992 | Cottam | G01P 1/026 310/168 |
| 5,975,761 A | 11/1999 | Ouchi et al. | |
| 10,348,076 B2 | 7/2019 | Gallion et al. | |
| 2004/0108849 A1 | 6/2004 | Muramatsu et al. | |
| 2006/0277985 A1* | 12/2006 | Faetanini | F16C 41/007 73/121 |
| 2007/0145815 A1 | 6/2007 | Swanson | |
| 2010/0090440 A1* | 4/2010 | Reichstetter | B62M 1/10 280/293 |

(Continued)

OTHER PUBLICATIONS

HellermannTyton, “Blind Hole Mount,” <https://www.hellermanntyton.us/featured-products/blind-hole-mount> web page visited Aug. 15, 2024 (4 pages).

(Continued)

*Primary Examiner* — Christopher P McAndrew
(74) *Attorney, Agent, or Firm* — Michael Best & Friedrich LLP

(57) ABSTRACT

A wheel speed sensor assembly including a sensor having a housing. The housing includes a central body that defines a sensor axis that extends longitudinally through the central body. The housing is constructed of a polymer and includes a first end and a second end opposite the first end. The first end is configured for insertion into a first aperture along the sensor axis. The wheel speed sensor assembly includes a flange disposed proximal to the second end relative to the first end and includes a fastener aperture. The wheel speed sensor assembly includes a press-in fastener engaged with the fastener aperture for mounting in a second mounting aperture along a fastener axis that is parallel to the sensor axis so that the sensor and the press-in fastener can be assembled and secured into the first and second apertures, respectively, with a single assembly motion parallel to the sensor axis.

14 Claims, 4 Drawing Sheets

(56) References Cited

U.S. PATENT DOCUMENTS

| | | | | |
|---|---|---|---|---|
| 2015/0331005 | A1 | 11/2015 | Dalisdas et al. | |
| 2018/0188079 | A1* | 7/2018 | Ko | G01D 5/34707 |
| 2020/0355755 | A1* | 11/2020 | Tysman | G01P 1/026 |

OTHER PUBLICATIONS

Bosch, "Wheel-speed sensor, Non-contacting determination of the wheel speed of brake control systems", <https://www.bosch-mobility.com/en/solutions/sensors/wheel-speed-sensor/>, 2024, 8 pages.

* cited by examiner

PLUG AND PLAY WHEEL SPEED SENSOR

BACKGROUND

The present disclosure relates to a mounting arrangement for a wheel speed sensor assembly.

SUMMARY

The present disclosure provides, in one aspect, a wheel speed sensor assembly including a sensor having a sensor housing. The sensor housing includes a central body that defines a sensor axis that extends longitudinally through the central body. The sensor housing is constructed of a polymer and includes a first end and a second end opposite the first end. The first end is configured for insertion into a first aperture along the sensor axis. The wheel speed sensor assembly includes a flange disposed proximal to the second end relative to the first end and includes a fastener aperture. The wheel speed sensor assembly includes a press-in fastener engaged with the fastener aperture for mounting in a second mounting aperture along a fastener axis that is parallel to the sensor axis so that the sensor and the press-in fastener can be assembled and secured into the first and second apertures, respectively, with a single assembly motion parallel to the sensor axis.

The present disclosure provides, in another aspect, a kit including a wheel speed sensor having a monolithic sensor housing defining a sensor axis. The sensor axis extends longitudinally through the sensor housing and the sensor housing is constructed of a polymer. The sensor housing includes a first end and a second end opposite the first end. The second end includes a flange having a fastener aperture that defines a fastener axis extending centrally through the fastener aperture. The fastener axis is parallel to the sensor axis. The kit includes a press-in fastener pre-assembled into the fastener aperture of the flange.

The present disclosure provides, in yet another aspect, a method of mounting a wheel speed sensor assembly. The method includes providing a first mounting aperture and a second mounting aperture, providing a sensor having a sensor housing, the sensor housing including a central body and a flange having a fastener aperture, and inserting a press-in fastener into the fastener aperture. The method includes aligning the central body with the first mounting aperture, aligning the press-in fastener with the second mounting aperture, inserting the central body into the first mounting aperture, and inserting the press-in fastener into the second mounting aperture concurrently with the insertion of the central body into the first mounting aperture. The method includes securing the press-in fastener into the second mounting aperture.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

DETAILED DESCRIPTION

Figure 1:
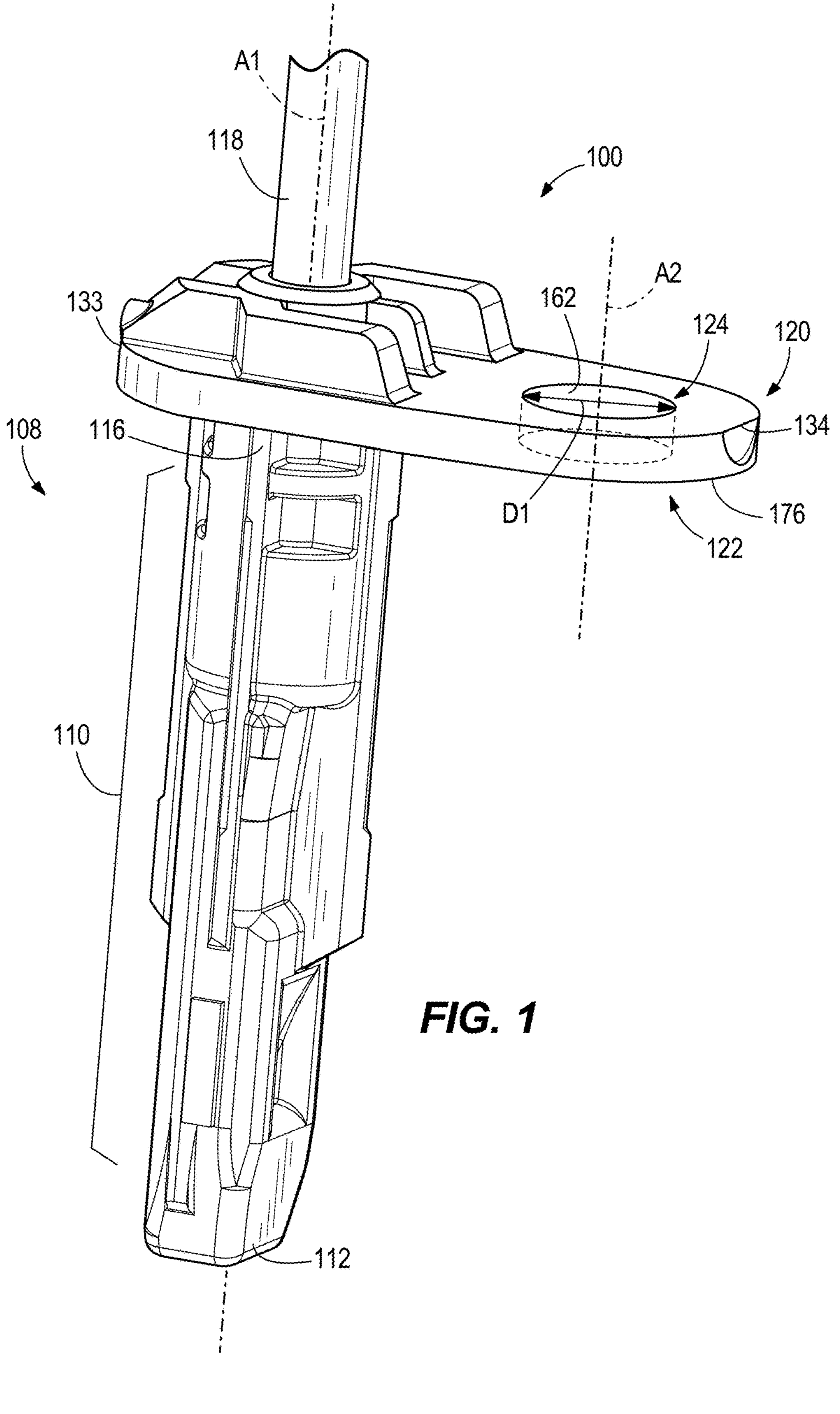
FIG. 1 illustrates a sensor of a wheel speed sensor assembly.
Figure 3:
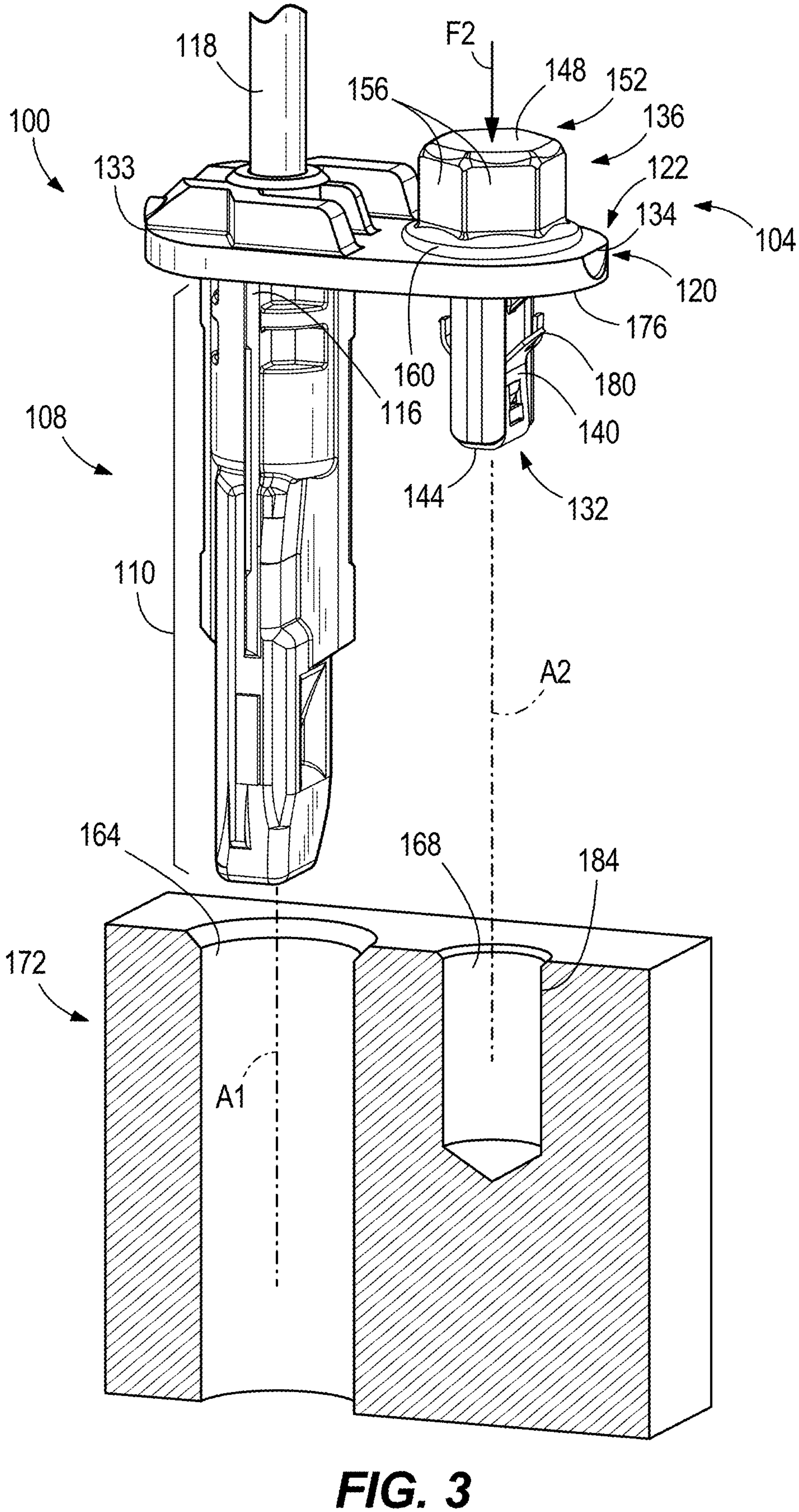
FIG. 3 illustrates the wheel speed sensor assembly aligned with a first aperture and a second aperture.

FIG. 1 illustrates a sensor 100 of a wheel speed sensor assembly 104 (FIG. 3). The sensor 100 includes a sensor housing 108 having a central body 110 that defines a sensor axis A1 that extends longitudinally though the central body 110. In the illustrated construction, the central body 110 defines an elongated profile. In the illustrated construction, the sensor housing 108 is constructed of a polymer (e.g., glass-filled nylon or polypropylene, among others). In some constructions, the polymer is PA612, PA6, or PA66. The sensor housing 108 defines a first end 112 and a second end 116 that is opposite the first end 112. In the illustrated construction, the first end 112 supports the sensor element (not shown) and the second end 116 supports a wire harness 118. In some constructions, the sensor element detects increments (e.g., steps) of a tone ring that is mounted to a rotating portion of a hub assembly for a vehicle. As the tone ring rotates, the sensor element detects the increments as the increments are rotated past the sensor element. The sensor element detects the rotation and outputs a signal to a controller (not shown) of the detected rotation. The controller is programmed with an algorithm that calculates the rotational speed of the wheel based on the counted number of increments per unit time. The controller may also be programmed to use the signal from the sensor 100 to calculate vehicle speed based on the rotational speed and an outside tire diameter programmed into a memory of the controller or in communication with the controller. Output from the sensor 100 may be used for a variety of advanced vehicle features including, but not limited to, anti-lock braking, traction control, and stability (yaw) control.

Figure 2:
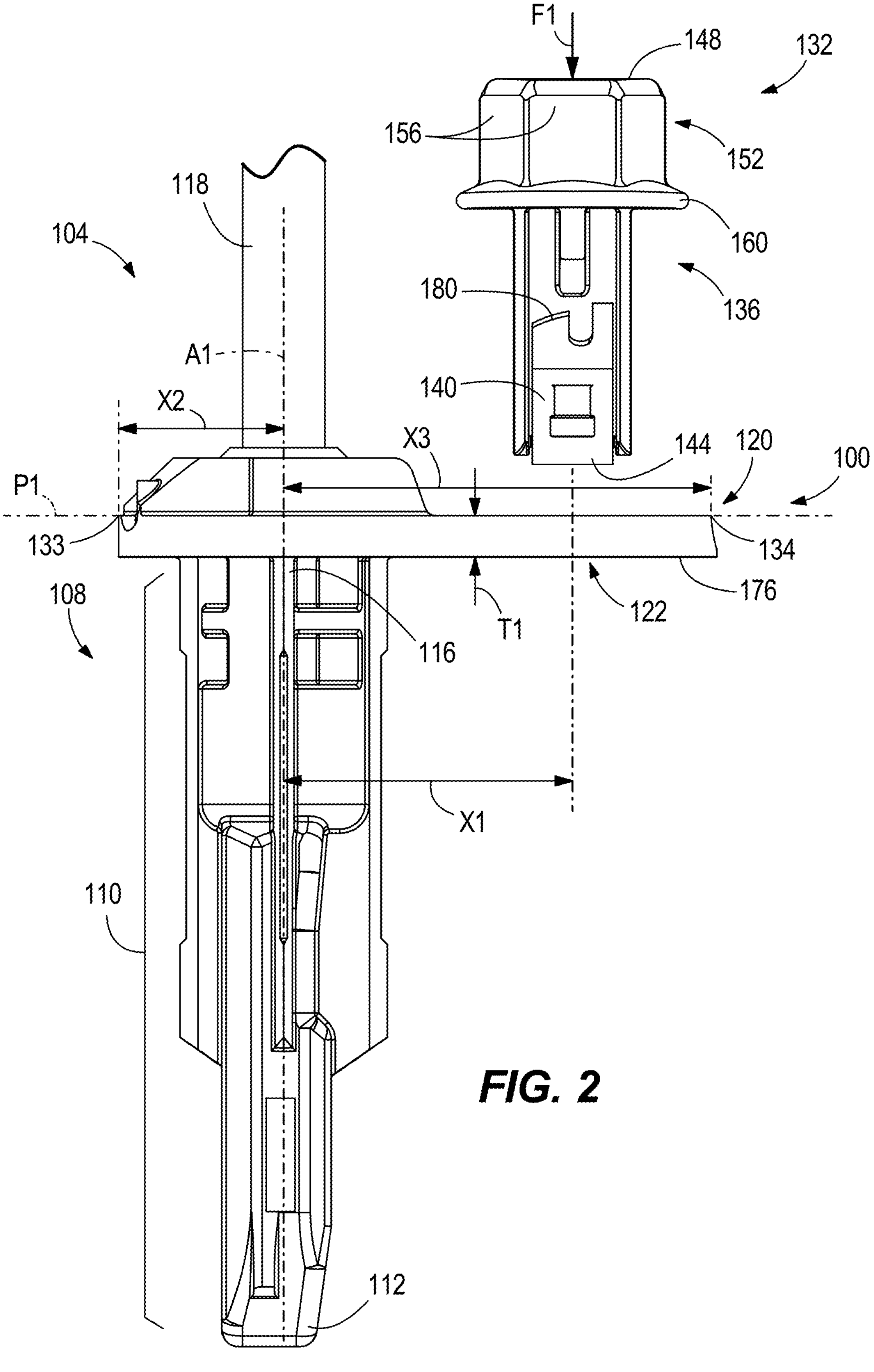
FIG. 2 illustrates a press-in fastener of the wheel speed sensor assembly aligned with the sensor of FIG. 1.

The wheel speed sensor assembly 104 includes a flange 120 that is disposed proximal to the second end 116 relative to the first end 112. The wire harness 118 passes through the flange 120 and into the second end 116. In the illustrated construction, the flange 120 defines a plane P1 that is perpendicular to the sensor axis A1 and a first thickness T1 measured in a direction parallel to the sensor axis A1. The first thickness T1 is between 1 millimeters and 7 millimeters. Specifically, in some constructions, the first thickness T1 is between 2 millimeters and 2.5 millimeters. The flange includes an eccentric portion 122 that is disposed radially offset from the central body 110 relative to the sensor axis A1. In other words, the eccentric portion 122 is disposed radially offset from the sensor axis A1. The eccentric portion 122 is cantilevered relative to the central body 110. The eccentric portion 122 includes a fastener aperture 124 configured to receive a press-in fastener 132 (FIG. 2). The fastener aperture 124 defines a diameter D1 and a fastener axis A2 that extends centrally through the fastener aperture 124. In the illustrated construction, the diameter D1 is between 4 millimeters and 9 millimeters. In the illustrated construction, the sensor axis A1 and the fastener axis A2 are parallel to one another. The fastener axis A2 is disposed radially offset from the sensor axis A1. Specifically, in the illustrated construction, the fastener axis A2 is disposed radially offset from the sensor axis A1 at a distance X1 between 12 millimeters and 20 millimeters (FIG. 2). The flange 120 includes a first end 133 and a second end 134 on the plane P1 (FIG. 2). The first end 133 is proximal to the sensor axis A1 relative to the second end 134. In some constructions, the first end 133 is disposed at a distance X2 between 7 millimeters and 12 millimeters from the sensor axis A1 on the plane P1. The second end 134 is disposed on the eccentric portion 122 of the flange 120. In some constructions, the second end 134 is disposed at a distance X3 between 18 millimeters and 25 millimeters from the sensor axis A1 on the plane P1. In some constructions, the second end 134 is located at a distance from the sensor axis A1 on the plane P1 that is at least double the distance from the first end 133 relative to the sensor axis A1 on the plane P1.

In the illustrated construction, the sensor housing 108 and the flange 120 are combined in a monolithic construction. In other words, the sensor housing 108 and the flange 120 are formed as a single piece (e.g., a monolithic sensor housing). As such, the flange 120 is constructed of the same polymer as the sensor housing 108. In other constructions, the sensor housing 108 and the flange 120 are formed as separate pieces and are joined tother in a post-manufacturing process (e.g., ultrasonic welding, threaded connection, etc.). In some constructions, the sensor housing 108 and the flange 120 may be formed out of different materials in the instance that the sensor housing 108 and the flange 120 are made from separate pieces.

FIG. 2 illustrates the wheel speed sensor assembly 104 including the press-in fastener 132. In the illustrated construction, the press-in fastener 132 comprises a plastic clip 136 and a metallic insert 140. The press-in fastener 132 is a blind hole mount. In some constructions, the press-in fastener 132 can be similar to or the same as fasteners commercially available from HellermannTyton, Milwaukee, WI. The press-in fastener 132 includes a first end 144 and a second end 148. The first end 144 receives the metallic insert 140 and the second end 148 includes a head 152. In the illustrated construction, the head 152 includes a tool engagement feature such as wrench flats 156. In other constructions, the head 152 includes a screw drive (e.g., Phillips, Torx, etc) configured to receive a screwdriver tool or bit. The press-in fastener 132 includes a shoulder 160 disposed between the first and the second ends 144, 148. The shoulder 160 is configured to engage the flange 120 and delimits the wrench flats 156.

To assemble the wheel speed sensor assembly 104, the press-in fastener 132 is aligned with the fastener axis A2 of the sensor 100. The press-in fastener 132 is moved axially along the fastener axis A2 such that the shoulder 160 contacts the flange 120. In the illustrated construction, the press-in fastener 132 is directed along the fastener axis A2 and into the fastener aperture 124. This may require a threshold force F1 to couple the press-in fastener 132 to the sensor 100. In some constructions, the threshold force F1 is 25 N to 65 N (e.g., 45 N). The single axial movement/force can be the only movement/force required to achieve installation, and may be achieved manually by a human technician, without the use of tools. In the assembled state of the wheel speed sensor assembly 104, the first end 144 of the press-in fastener 132 is disposed proximal to the first end 112 of the sensor housing 108 relative to the second end 148 along the fastener axis A2. The press-in fastener 132 is received by the fastener aperture 124 without a bushing therebetween. In other words, the press-in fastener 132 contacts a surface 162 of the fastener aperture 124. In some constructions, coupling the press-in fastener 132 to the flange 120 results in a pre-assembled kit. The wheel speed sensor assembly 104 may be shipped as a kit with the press-in fasteners 132 pre-assembled. The kits have "plug and play" compatibility, which will be discussed in more detail below.

FIG. 3 illustrates the wheel speed sensor assembly 104 prior to being inserted in a first mounting aperture 164 and a second mounting aperture 168. In the illustrated construction, the first and second apertures 164, 168 are provided on a portion 172 of a wheel hub. In the illustrated construction, the press-in fastener 132 is pre-assembled into the fastener aperture 124 before the press-in fastener 132 is inserted into the second aperture 168. In other words, the press-in fastener 132 is inserted into the fastener aperture 124 without being inserted into the second aperture 168. In some constructions, the press-in fastener 132 is inserted into the fastener aperture 124 and the second aperture 168 concurrently. The wheel speed sensor assembly 104 is aligned with the first and second apertures 164, 168 prior to insertion of the wheel speed sensor assembly 104. Specifically, the sensor axis A1 is aligned with the first aperture 164 such that the sensor axis A1 extends centrally through the first aperture 164 because the first end 112 is configured for insertion into the first aperture 164 along the sensor axis A1. The fastener axis A2 is aligned with the second aperture 168 such that the fastener axis A2 extends centrally through the second aperture 168 because the press-in fastener 132 engages with the fastener aperture 124 for mounting in the second aperture 168 along the fastener axis A2.

The wheel speed sensor assembly 104 is inserted into the first and second apertures 164, 168 concurrently in some constructions, at least along a portion of an assembly motion. Specifically, at some position during the insertion of the wheel speed sensor assembly 104 prior to being fully inserted, both the apertures 164, 168 are occupied concurrently with the wheel speed sensor assembly 104 (i.e., the sensor housing 108 is within the first aperture 164 and the press-in fastener 132 is within the second aperture 168). Specifically, the central body 110 is inserted into the first aperture 164 and the press-in fastener 132 is concurrently inserted into the second aperture 168. The press-in fastener 132 permits the wheel speed sensor assembly 104 to be inserted and secured to the portion 172 with a singular assembly motion parallel to the sensor axis A1. In other words, the wheel speed sensor assembly 104 is considered to have "plug and play" compatibility due to the single assembly motion. To couple the wheel speed sensor assembly 104 to the portion 172, the press-in fastener 132 is directed along the fastener axis A2 and into the second aperture 168 with a threshold force F2. In some constructions, the threshold force F2 is 45 N. In some constructions, the press-in fastener 132 is configured to be pressed into the aperture 168 manually by hand, without tools. The flange 120 is compressed by the shoulder 160 of the press-in fastener 132 to the second aperture 168, which clamps the flange 120 to a portion 172 of the wheel hub.

Figure 4:
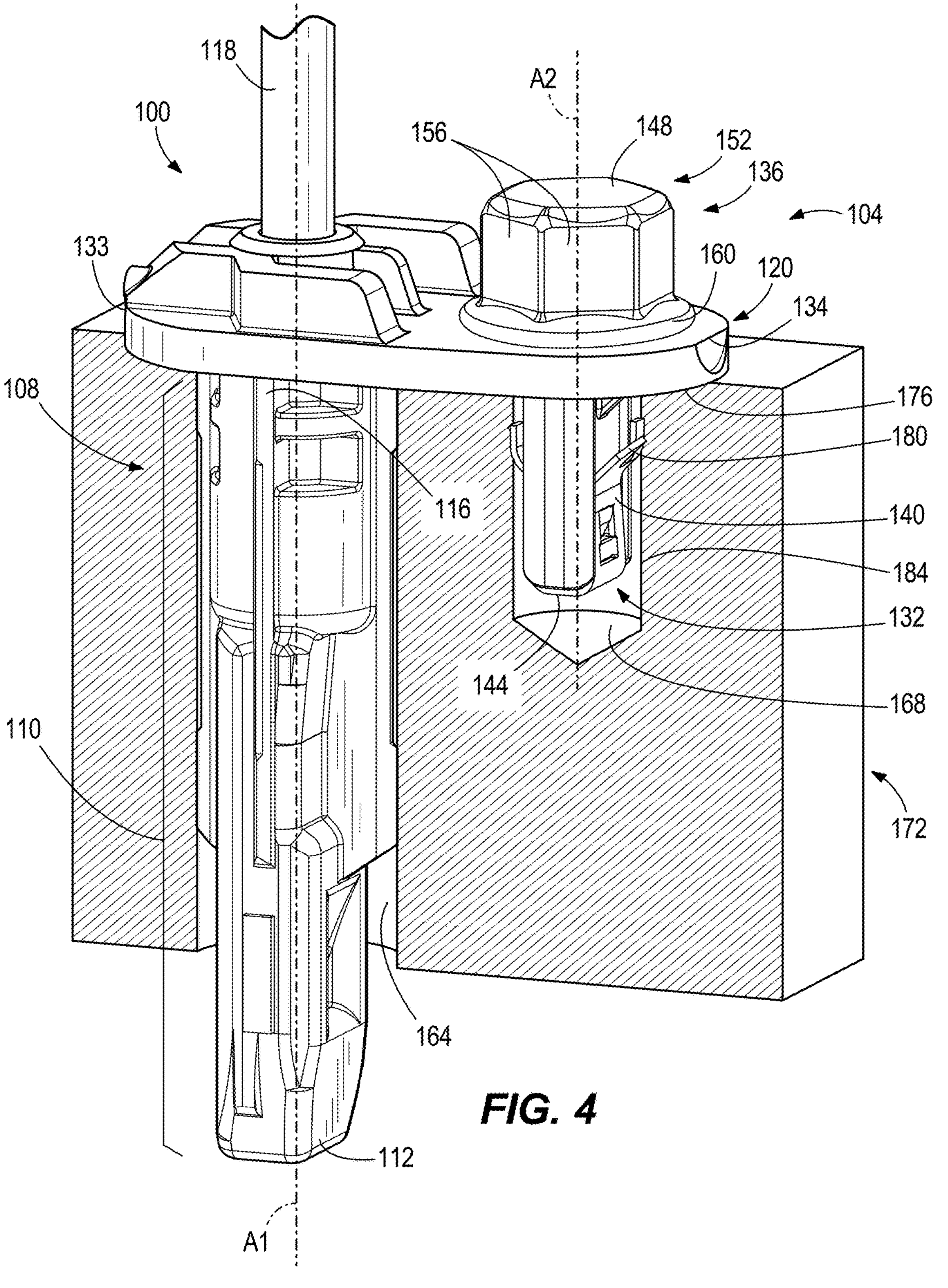
FIG. 4 illustrates the wheel speed sensor assembly secured in the first and second apertures.

FIG. 4 illustrates the wheel speed sensor assembly 104 inserted into the first and second apertures 164, 168. The wheel speed sensor assembly 104 is considered to be fully inserted into the first and second apertures 164, 168 when a bottom surface 176 of the flange 120 contacts the portion 172. The press-in fastener 132 secures the sensor 100 to the portion 172 upon insertion of the wheel speed sensor assembly 104. Specifically, the metallic insert 140 includes flanges 180 configured to engage walls 184 of the second aperture 168, thereby securing the flange 120 between the shoulder 160 and the portion 172. In other words, the final inserted assembly position of the wheel speed sensor assembly 104 relative to the apertures 164, 168 is maintained solely by the press-in fastener 132. In the instance that the sensor assembly 104 is to be removed, the press-in fastener 132 may be rotated clockwise or counter-clockwise about the fastener axis A2. Specifically, in the illustrated embodiment, the press-in fastener 132 must be rotated a full 360 degrees to be removed.

Although the invention has been described in detail with reference to certain preferred constructions, variations and modifications exist within the scope and spirit of one or more independent aspects of the invention as described.

What is claimed is:

1. A wheel speed sensor assembly comprising:

a sensor including a sensor housing, the sensor housing having a central body that defines a sensor axis, the sensor axis extending longitudinally through the central body, the sensor housing constructed of a polymer and including a first end and a second end opposite the first end, the first end is configured for insertion into a first mounting aperture along the sensor axis;

a flange disposed proximal to the second end relative to the first end and including a fastener aperture; and a press-in fastener engaged with the fastener aperture for mounting in a second mounting aperture along a fastener axis that is parallel to the sensor axis so that the sensor and the press-in fastener can be assembled and secured into the first and second mounting apertures, respectively, with a single assembly motion parallel to the sensor axis.

2. The wheel speed sensor assembly of claim 1, wherein the sensor housing and the flange are combined in a monolithic construction.

3. The wheel speed sensor assembly of claim 1, wherein the press-in fastener is received by the fastener aperture without a bushing.

4. The wheel speed sensor assembly of claim 1, wherein the fastener axis is disposed radially offset from the sensor axis at a distance between 10 millimeters and 18 millimeters.

5. The wheel speed sensor assembly of claim 1, wherein the sensor housing defines an elongated profile.

6. The wheel speed sensor assembly of claim 1, wherein the flange defines a thickness in a direction parallel to the sensor axis, the thickness being between 5 millimeters and 10 millimeters.

7. A kit comprising:

a wheel speed sensor including a monolithic sensor housing defining a sensor axis, the sensor axis extending longitudinally through the sensor housing, the sensor housing being constructed of a polymer and including a first end and a second end opposite the first end, the second end including a flange having a fastener aperture that defines a fastener axis extending centrally through the fastener aperture, the fastener axis being parallel to the sensor axis; and a press-in fastener pre-assembled into the fastener aperture of the flange.

8. The kit of claim 7, wherein the flange includes an eccentric portion that is radially offset from a central body of the sensor housing.

9. The kit of claim 7, wherein the press-in fastener is pre-assembled into the fastener aperture without a bushing therebetween.

10. The kit of claim 7, wherein the press-in fastener includes a first end and a second end, wherein the first end of the press-in fastener is proximal to the first end of the sensor housing on the fastener axis relative to the second end of the press-in fastener.

11. A method of mounting a wheel speed sensor assembly, the method comprising:

providing a first mounting aperture and a second mounting aperture;

providing a sensor having a sensor housing, the sensor housing including a central body and a flange having a fastener aperture;

inserting a press-in fastener into the fastener aperture;

aligning the central body with the first mounting aperture;

aligning the press-in fastener with the second mounting aperture;

inserting the central body into the first mounting aperture;

inserting the press-in fastener into the second mounting aperture concurrently with the insertion of the central body into the first mounting aperture; and securing the press-in fastener into the second mounting aperture.

12. The method of claim 11, wherein the central body defines a sensor axis and the fastener aperture defines a fastener axis, wherein the sensor axis and the fastener axis are parallel.

13. The method of claim 11, wherein the securing of the press-in fastener into the second mounting aperture includes compressing the flange with a shoulder of the press-in fastener to the second mounting aperture thereby clamping the flange to a portion of a wheel hub.

14. The method of claim 11, wherein the insertion of the press-in fastener into the fastener aperture occurs before the insertion of the press-in fastener into the second mounting aperture.

* * * * *